SAMUEL H. FULLER, JR.
JOHN E. COORDES
INVENTORS

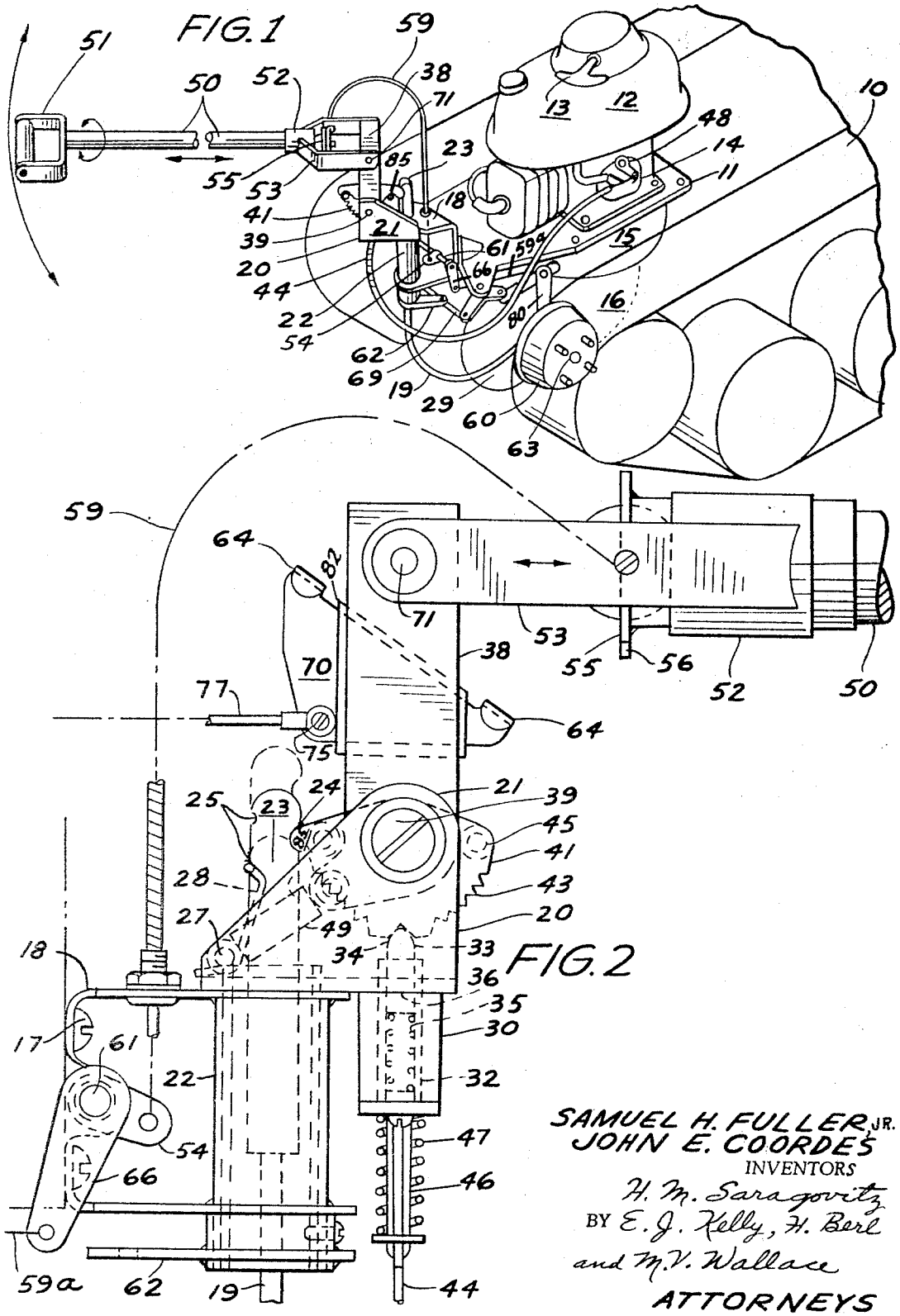

BY H. M. Saragovitz
E. J. Kelly, H. Berl
and M. V. Wallace
ATTORNEYS

United States Patent Office 3,444,945
Patented May 20, 1969

1

3,444,945
VEHICLE CONTROL
John E. Coordes, Birmingham, and Samuel H. Fuller, Jr., Warren, Mich., assignors to the United States of America as represented by the Secretary of the Army
Filed Feb. 27, 1967, Ser. No. 619,529
Int. Cl. B62d 51/04, 55/00
U.S. Cl. 180—19                                    7 Claims

ABSTRACT OF THE DISCLOSURE

An apparatus for vehicle control that may be built as a separate unit and secured to a small tracked load carrying device, or that may be utilized with a wheeled vehicle, whereby the vehicle is controlled by a single control means. The apparatus includes a steering handle, a transmission control, a carburetor control, a steering and parking brake control and an engine kill switch actuated by dropping the handle.

The invention described herein may be manufactured and used by or for the Government of the United States of America for governmental purposes without payment of any royalties thereon or therefor.

This invention relates to vehicle controls, and more particularly to a new and unique control that may be built as a separate unit and secured to a small tracked load carrying device, or that may be utilized with a wheeled vehicle.

This mechanism reduces the complexity of vehicle control to the simplicity of a child's coaster wagon requiring all the same movements to obtain the same reactions. If a walking operator pulls the tongue or handle, the vehicle follows, and if he pushes it the vehicle proceeds in that direction.

If the handle is folded back toward the vehicle this allows the operator to ride in the vehicle, and if he pushes the handle the vehicle goes forward, and if he pulls back on it, the vehicle reverses. If the operator walking or riding yaws the handle the vehicle steers just like a child's wagon.

A control, such as disclosed herein, is very desirable inasmuch as very little training of operators is required.

The principal object of the present invention is to provide a new and unique vehicle control unit that may be quickly installed upon a vehicle and the vehicle controlled by means of a single wagon tongue.

Another object of the invention is to provide a new and unique vehicle control that, by means of a wagon tongue, may be pulled, pushed, or yawed, or that may be controlled by the tongue while the operator is seated upon the vehicle or walking, leaving one arm and hand free.

A further object of the invention is to provide a new and unique vehicle control wherein shifting from neutral to forward or reverse, accelerating, steering and braking are all accomplished on or off vehicle by one lever at the top of which is pinned the wagon tongue and through which is translated the desired movement of the vehicle.

A still further object is to provide an engine kill switch to kill the engine if the operator should drop the handle while either walking or riding.

The above and other objects of the invention will appear more fully from the following more detailed description and from the drawings, wherein:

FIG. 1 is a perspective view showing a vehicle with the instant invention incorporated thereon.

FIG. 2 is an isolated side view of the control alone of the device.

2

Figure 5:
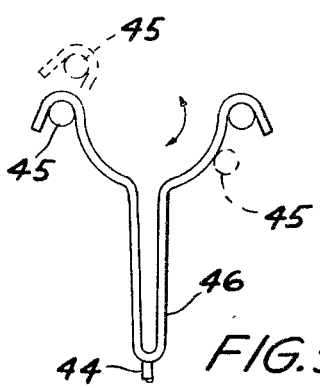

FIG. 5 is a detail of the Y-shaped spring wire control means secured by stubs on the sector.

Referring now to the drawings, the numeral 10 designates a vehicle having a mounting plate 11 for use in mounting an engine 12 upon a vehicle. A starting rope 13 is provided for a purpose later to be described. A carburetor 14 is provided along with a converter and clutch 15 and a transmission 16.

The invention per se consists of a built-up structure comprising a U-shaped bracket member 18 that may be securely fastened to the mounting plate 11 by means of screws 17, or the like.

Rotatably supported upon the top of bracket 18 is an additional movable bracket 20, the same having formed thereon opposed vertical sections 21. A hollow tube member 22 is rotatably interposed between the top and bottom of bracket 18, the same having disposed therein, for vertical movement, a shifting shuttle 23, said shuttle having formed thereon indents 25 on the back edge of same, and an indent 24 on the front edge of same. The lower end of tube 22 has secured thereto, for movement therewith a collar having mounted thereon, a pitman arm 62, the same also having connected thereto a steering linkage 69, FIG. 1.

A cable 19 having one end thereof secured to the lower end of shuttle 23, is provided, the same leading to transmission 16 to actuate same when desired.

A transverse rod member 27 is provided, the same being mounted within and supported by opposed sections 21 of movable bracket 20, FIG. 2, said rod having mounted thereon a spring member 28, the same being adapted to engage and hold in a predetermined position shuttle 23 by contacting indents 25 formed on the back edge of the shuttle, to actuate cable 19 leading to transmission 16.

Secured to and located beneath bracket 20, an additional U-shaped bracket 30 is provided, the same having secured thereto a casing 32 adapted to support therein a detent 33 having the top tip thereof rounded, as at 34. A spring 35 is provided within casing 32 to hold detent 33 upwardly at all times. Casing 32 projects above the base of bracket 20 through an opening 36 cut therein.

Figure 3:
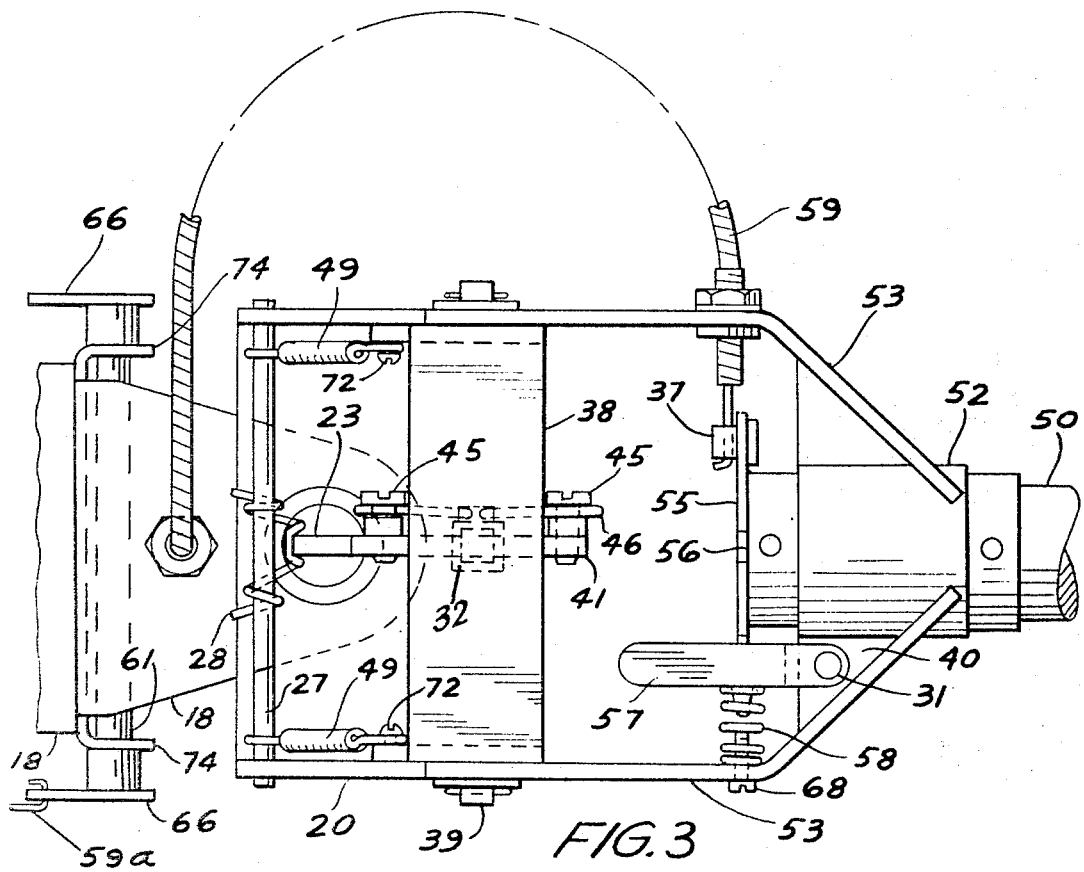
FIG. 3 is a top plan view of the device.
Figure 4:
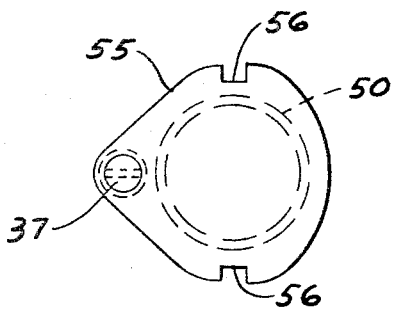
FIG. 4 is a detail of the cam member secured to the control tongue.

An actuating U-shaped bracket lever 38 is provided, the same being inverted and mounted within the vertical side sections 21 of bracket 20, by means of a transverse shaft member 39. Shaft 39 has mounted thereon and adapted to move therewith, a control member comprising a sector-like member 41 having a portion thereof 85 formed as a pawl, the lower edge of the sector having formed therein a plurality of teeth 43. Teeth 43 are adapted to engage the rounded portion 34 of detent 33, said detent and teeth being in vertical alignment at all times. Fastening means 45 are provided, one on each side of sector 41, the same being adapted to receive a Y-shaped spring wire 46, FIG. 5, which in turn actuates accelerator cable control 44. The spring wire 46 passes downwardly from sector 41 through the opening 36 adjacent the casing 32, through the bottom of bracket 30 where a spring member 47 encircles same to hold spring wire 46 taut upon stubs 45. The accelerator control 44 passes through flexible tubing to accelerator lever 48 on carburetor 14. Opposed spring members 49, FIGS. 2 and 3, are provided, one end of same being mounted upon transverse rod member 27, while the opposite ends of same are secured to opposed sides of U-shaped lever 38, by means of securing screws 72.

A tongue member 50, having a hand grip 51 secured to one end thereof, is provided. The opposite end of the tongue is rotatably supported within a sleeve member 52 which is formed as an integral part of a yoke 53. The yoke 53 is pivotally mounted upon the upper portion of U-shaped lever 38, as at 71. A cam member 55, FIGS. 1–4, is secured to and rotates with tongue 50 adjacent sleeve 52, said cam having formed therein opposed notches 56, FIG. 4. Notches 56 are adapted to engage, and hold against movement, trigger-stop member 57, FIG. 3. Trigger-stop member 57 is pivotally mounted by means of a screw 31, upon a gusset plate 40, formed between yoke 53 and sleeve 52. A spring member 58 is interposed between trigger stop 57 and yoke 53, and held thereto by means of a screw 68, to hold trigger stop 57 in engagement with cam 55 at all times. A cable member 59 is secured to cam 55, as at 37, the same leading from cam 55 to a crank 54, FIG. 2, said crank being mounted midway on a shaft 61 between opposed tab members 74, FIG. 3, said tab members being formed integrally on the back of U-shaped bracket 18. Mounted on each end of shaft 61, and adapted to move therewith, are levers 66 (FIG. 3). One end of cable 59 is secured within an opening in crank 54 and a continuation of cable 59–59a, is secured to an opening formed in one of levers 66 and leads to the vehicle parking brake 60.

A transverse shaft 63, FIG. 1, upon which parking brake 60 is mounted, passes beneath the vehicle frame to a similar brake member mounted on the opposite side of the vehicle not shown, and has mounted therein a differential 29.

The vehicle is steered by means of the pitman arm 62, which is mounted on a collar secured to tube 22 and connected to linkage 69 adapted to operate parking brake 60.

Should the operator drop tongue 50, while either walking or riding, an engine short kill tab 70 is provided the same comprising a triangularly-shaped plate member, having tangs 64 formed thereon, insulated, as at 82, and mounted on U-shaped bracket lever 38, with an electric lead line 77 secured to plate 70, by means of screw 75 connecting the plate with engine 12.

The manner in which the device operates is as follows:

Before starting engine 12 the operator moves tongue 50 to set sector 41 so that the center notch of same is in vertical contact with rounded top 34 and detent 33 mounted in casing 32 and shifting shuttle 23 is in engagement with the pawl portion 85 of the sector, the same nesting in indent 24 on the front edge of the shuttle, as shown in FIG. 2. The shuttle is now held against movement. Also U-shaped bracket lever 38 and tongue 50 are now in the center or vertical position, and transmission 16 is in neutral. The engine may now be started by means of starter rope 13, which is pulled until the engine starts. The vehicle engine is now in neutral-idling and lever 38 and tongue 50 are still in the center or vertical neutral position, as shown in FIG. 2.

If the operator wishes to move the vehicle forward he simply pulls, when walking, or pushes, when riding, tongue 50 forward until control sector 41 is tilted downward to the right one notch on sector 41, which movement is imparted to Y-shaped wire 46 secured to stubs 45 on the sector which movement is also imparted to cable 44 secured to wire 46 which leads to accelerator arm 48. As the sector is tilted further to the right FIG. 2, shifting shuttle 23 is raised by the sector's pawl shuttle tion 85 being in engagement therewith, which shuttle movement is imparted to cable 19, which leads to transmission 16. The transmission is now in proper gear, but acceleration at this point is not sufficient to engage centrifugal clutch 15. As the tongue is pulled further in the same direction one additional notch—due to increased acceleration, clutch 15 engages and the vehicle is under way in the selected direction, but at low speed. Any further movement of the tongue in the direction of movement will increase the speed of the vehicle, cable control 46 on sector 41, acting as an actuator for accelerator arm 14 through cable 44. As sector 41 is tilted further to the right, as shown in FIG. 2, shifting shuttle 23, which is still in engagement with sector 41, is lifted through engagement of pawl 85 with indent 24 on the shuttle, which upward movement of the shuttle is imparted to transmission 16 by means of cable 19.

As the vehicle is further accelerated, by means of the tilting movement of the sector 41, the sector will tilt away from indent 24 on shuttle 23 and pass free from same. To support shuttle 23 in the position set when disengagement between sector and shuttle occurs, spring member 28, mounted on transverse rod 27, engages one of indents 25 formed on the back edge of the shuttle to hold the shuttle in the position set by the sector as it tilted away from indent 24. As the sector is tilted in the opposite direction, i.e., to the left in FIG. 2, it again engages shuttle 23, as at 24, and as the shuttle is forced downwardly, spring 28 becomes disengaged from indents 25, so that the shuttle may descend to actuate linkage 19 and thus transmission 16. Springs 49 provide an easier return to the vertical, or neutral, position of U-shaped lever 38.

A reversing of the tongue 50, i.e., opposed to direction of movement, decelerates the vehicle and if continued will cause the vehicle and engine to idle. As the sector 41 moves in the opposite direction the acceleration linkage and shifting shuttle are reversed, decelerating the vehicle until the same is again in neutral.

If the operator wishes to reverse the vehicle he has simply, from the neutral position, to move the tongue toward the vehicle which in turn causes the controls to perform the same steps as outlined above, but in a reverse or opposite direction—the sector 41 being tilted in the opposite direction and the control secured thereto acts to actuate the accelerator 48, while the shifting shuttle 23 is lowered to cause transmission 16 to reverse.

To lock or unlock the parking brake 60, tongue 50 is rotated 90° in either a clockwise or counter-clockwise direction, as shown by the arrows in FIG. 1, to set the brake. As the tongue rotates, cam 55 secured thereon also rotates until trigger stop 57 engages one of the slots 56 formed in cam 55 and locks the cam against movement. As the cam is rotated, cable 59 secured thereto, as at 37, is actuated and inasmuch as the cable has one end thereof secured to crank 54 mounted on shaft 61, which has mounted on one end thereof lever 66, and lever 66 has secured thereto cable 59a leading to brake lever 80, FIG. 1, brake 60 is locked.

To release the parking brake, trigger stop 57 is moved out of engagement from its engaged notch by forcing trigger stop 57 against spring 58 and out of engagement with notch 56 which allows cam 55 to rotate and through linkage numbered 59, 54, 66 and 59a releases the parking brake (FIG. 2).

To steer the vehicle, tongue 50 can be yawed in an arc either right or left while the operator is walking the vehicle, or it can be turned the same distance while riding upon the vehicle. The operator can actuate the pitman arm 62, if the vehicle is either wheeled or tracked, through the brake differential steer 29, FIG. 1.

The illustrated disclosure is tracked, whereas the brake is applied, the differential allows turn.

The engine kill switch 70 provides a safety feature in case the operator should drop the tongue while walking or riding, in which case the switch becomes operative. The switch is mounted on bracket lever 38, and when the tongue is dropped, yoke 53 makes contact with tang 64 of plate 70, shorting out engine 12 through lead 77 secured to plate 70, as at 75.

The operator, before starting engine 12, must always be sure the tongue 50 is not in contact with the tangs 64 of kill switch 70, which would in turn short out the engine and same would not start. To overcome this liability the tongue 50 should be held free of the switch 70 by means of a clip, or the like, not shown, that would tend to hold the tongue 53 and U-shaped bracket lever 38 engaged in vertical alignment away from the switch until the engine 12 has been started.

There has been disclosed herein a new and unique vehicle control mechanism which reduces the complexity of vehicle control to the simplicity of a child's coaster wagon requiring all the same movements to obtain the same reactions. If a walking operator pulls the tongue or handle the vehicle follows and if he pushes it the vehicle proceeds in that direction. If the handle is folded back toward the vehicle this allows the operator to ride in the vehicle and if he pushed the handle the vehicle goes forward and if he pulls back on it the vehicle reverses. If the operator, walking or riding, yaws the handle, the vehicle steers just like a child's wagon. Shifting from neutral to forward or reverse, accelerating and steering are all accomplished by one lever or tongue, at the top of which is pinned the handle and through it is translated the desired movement of the vehicle. The device is not expensive to manufacture and can be quickly installed on a vehicle as a unit.

It will be obvious to those skilled in the art to which this invention relates that modifications may be made in details of construction and arrangement and matters of mere form without departing from the spirit of the invention which is not limited to such matters or otherwise than the prior art and the appended claims may require.

We claim:

1. A vehicle control apparatus adapted for use on a self-propelled vehicle to move said vehicle forward, backward or to park or steer said vehicle as selected, said vehicle having an engine, carburetor, transmission, and parking brake, comprising:
   a bracket support to be connected to said vehicle;
   means, including a toothed sector, carried by said bracket-support adapted to be connected to the vehicle carburetor for regulating said carburetor;
   transmission control means carried by said bracket support adapted to be connected to the vehicle transmission for controlling said transmission;
   steering means connected to said bracket support means for steering said vehicle, said means having incorporated therein a parking brake control for controlling the parking brake of said vehicle,
   said parking brake control comprising a tongue member rotatably mounted within a yoke,
   a notched cam member secured to one end of said tongue and adapted to rotate therewith;
   trigger stop means mounted within said yoke and adjacent said cam member;
   spring means for holding said trigger stop in engagement with said cam member;
   a crank member mounted centrally on a shaft member within said control mechanism;
   a lever mounted on one end of said shaft member;
   a cable means secured to said notched cam members and connected to said crank member;
   cable means secured to said lever mounted on one end of said shaft member and the other end thereof secured to said parking brake so that when said tongue is rotated, said notched cam with cable means secured thereto is also rotated, thereby actuating said cable and said crank member and hence said lever means to actuate said cable means between said lever means and said parking brake and said trigger stop means engages one of said notched cam members to lock said cam and said parking brake in locked relationship.

2. A vehicle control apparatus as set forth in claim 1, having an engine kill means to stop said engine when said steering means is dropped.

3. A vehicle control apparatus for use on a self-propelled vehicle to move said vehicle forward, backward or to park or steer said vehicle as selected, said vehicle having an engine, carburetor, transmission, and parking brake, wherein said means for controlling said carburetor comprises:
   a toothed sector member having mounting members thereon pivotally mounted upon a shaft member within the opposed sides of a bracket member,
   a spring wire control member adapted to engage said sector mounting member and the other end of said wire control being connected to cable means leading to said accelerator;
   a spring supported detent located below said sector and in vertical alignment therewith,
   lever means mounted upon said sector shaft member,
   a yoked tongue member pivotally mounted upon said lever means so that when said tongue is moved said shaft with said sector mounted thereon is rotated and in turn tilts said sector and hence said spring wire control and in turn actuates said accelerator.

4. A vehicle control apparatus for use on a self-propelled vehicle to move said vehicle forward, backward or to park or steer said vehicle as selected, said vehicle having an engine, carburetor, transmission, and parking brake, wherein said means for controlling said transmission comprises,
   a shuttle member mounted for vertical movement within a bracket member, said shuttle member having a plurality of spaced-apart indents on one edge thereof,
   a spring member mounted adjacent thereto adapted to engage said indents on said shuttle and support said shuttle member thereby,
   an indent on the opposed edge of said shuttle member adapted to engage and selectively support a toothed sector mounted on a shaft adjacent thereto;
   a cable member secured to the lower end of said shuttle leading to and connected with said transmission,
   a U-shaped lever member adapted to support said sector,
   a yoked tongue member pivotally mounted on said U-shaped lever member adapted to control the movement of said U-shaped lever and sector so that when said tongue is moved, said movement is imparted to said sector and said sector in turn actuates said shuttle and hence said cable member to said transmission to actuate and control same.

5. In a vehicle control apparatus as set forth in claim 4 wherein,
   said spring member mounted adjacent to and in contact with said shuttle member has means thereon to contact said indents on one edge of said shuttle member to support same once said sector has become disengaged therefrom.

6. A vehicle control apparatus as set forth in claim 4, wherein said means for selectively controlling said transmission, carburetor and parking brake comprises:
   a toothed sector pivotally mounted within a U-shaped bracket member,
   a spring supported detent vertically mounted within a casing and in engagement with said toothed sector,
   cable means secured to said sector and leading to said carburetor,
   a spring supported shuttle member vertically mounted adjacent said sector and in operable engagement therewith, cable means secured to the lower end of said shuttle leading to said transmission,
   a yoked tongue member pivotally mounted upon said U-shaped lever a member, said tongue having a locking cam on one end thereof,
   a crank member mounted centrally on a shaft member within said control mechanism,
   a lever mounted on one end of said shaft member,
   cable means secured to said notched cam member and connected to said crank member,
   cable means secured to said lever mounted on one end of said shaft member and the other end thereof secured to said parking brake so that said tongue member may be moved forward or backward to actuate said carburetor and transmission and rotated clockwise or counter-clockwise to actuate said parking brake.

7. A vehicle control apparatus for use on a self-propelled vehicle to move said vehicle forward, backward or to park or steer said vehicle as selected, said vehicle having an engine, carburetor, transmission, parking brake and an engine kill, wherein said means for selectively controlling said transmission, carburetor, parking brake and engine kill comprises, a toothed sector pivotally mounted within a U-shaped bracket member, a spring supported detent vertically mounted within a casing and in engagement with said toothed sector, cable means secured to said sector and leading to said carburetor, a spring supported shuttle member vertically mounted adjacent said sector in operable engagement therewith, cable means secured to the lower end of said shuttle leading to said transmission, a yoked tongue member pivotally mounted upon said U-shaped lever member, said tongue having a locking cam on one end thereof, a crank member mounted centrally on a shaft member within said control member, a lever mounted on one end of said shaft member, cable means secured to said notched cam member and connected to said crank member, cable means secured to said lever mounted on one end of said shaft member and the other end thereof secured to said parking brake so that said tongue member may be moved forward or backward to actuate said carburetor and transmission and rotate clockwise or counter-clockwise to actuate said parking brake, and an engine kill switch comprising a plate member having tangs formed thereon, mounted on said U-shaped lever, electric lead means from said switch to said engine adapted to stop said engine should said tongue member be dropped and make contact with said tangs thereby grounding said plate and said engine through said electric lead line to said engine.

References Cited

UNITED STATES PATENTS

| 1,539,186 | 5/1925 | Heller | 180—19 |
| 2,097,351 | 10/1937 | Smith | 52—26 |
| 3,024,858 | 3/1962 | Davis et al. | 180—19 X |
| 3,247,923 | 4/1966 | Cornell | 180—19 |

KENNETH H. BETTS, *Primary Examiner.*

JOHN A. PEKAR, *Assistant Examiner.*

U.S. Cl. X.R.

180—9.24; 56—10